United States Patent [19]

Sebastian et al.

[11] 4,197,096

[45] Apr. 8, 1980

[54] FLUID SUPPLY SYSTEM INCLUDING A PRESSURE-SWING ADSORPTION PLANT

[75] Inventors: Devasihamani J. G. Sebastian, Hoddesdon; Kenneth C. Smith, Roydon; David A. Webber, Bishops Stortford, all of England

[73] Assignee: BOC Limited, England

[21] Appl. No.: 935,974

[22] Filed: Aug. 22, 1978

[51] Int. Cl.² .............................................. B01D 53/04
[52] U.S. Cl. ........................................ 55/163; 55/389; 210/96.1; 210/192
[58] Field of Search .................... 55/21, 25, 26, 58, 62, 55/75, 163, 387, 389; 210/15, 63 R, 96 R, 192, 220

[56] References Cited

U.S. PATENT DOCUMENTS

| | | |
|---|---|---|
| 3,257,772 | 6/1966 | Maddox et al. ..................... 55/21 X |
| 3,561,464 | 2/1971 | Sher et al. ............................ 55/33 X |
| 3,748,262 | 7/1973 | Lee et al. .......................... 210/192 X |
| 3,796,022 | 3/1974 | Simonet et al. .......................... 55/25 |
| 3,856,671 | 12/1974 | Lee et al. .......................... 210/192 X |
| 3,922,149 | 11/1975 | Ruder et al. ........................ 55/25 X |
| 3,923,477 | 12/1975 | Armond et al. .......................... 55/25 |
| 4,065,272 | 12/1977 | Armond ..................................... 55/25 |

FOREIGN PATENT DOCUMENTS

1052553 12/1966 United Kingdom .

Primary Examiner—Robert H. Spitzer
Attorney, Agent, or Firm—Dennison, Dennison, Meserole & Pollack

[57] ABSTRACT

A fluid supply system includes a pressure-swing adsorption plant e.g. for supplying oxygen-rich gas to an activated sludge reactor in a sewage works. The product gas from the plant is supplied to the utilization apparatus by a compressor at a rate dependent on the demand for the gas, while waste gas is desorbed from the plant by a vacuum pump. When using the plant to separate oxygen from an air feedstock the major proportion of the power consumed by the plant is represented by the vacuum pump, which has to impell substantially greater volumes of gas than the product compressor. To economize on the power consumed by the plant, the rate of delivery of the vacuum pump is controlled by means sensitive to the demand of the utilization apparatus for product gas, so that a reduction in the demand from the product compressor leads to a reduction in the power consumption of the vacuum pump.

10 Claims, 2 Drawing Figures

FLUID SUPPLY SYSTEM INCLUDING A PRESSURE-SWING ADSORPTION PLANT

FIELD OF THE INVENTION

This invention relates to power economisation in fluid supply systems which use pumps and/or compressors (hereinafter referred to as collectively as 'fluid-dynamic machines') and more particularly to such systems which comprise gas separation plants operating on the principle of pressure-swing adsorption.

BACKGROUND OF THE INVENTION

Briefly, a pressure-swing adsorption (PSA) plant comprises one or more beds of a material which has the ability to selectively adsorb a component (or components) of a gas mixture fed to it, to leave an unadsorbed gas which is rich in another component (or components) of the original feedstock. The operation of any one bed is necessarily cyclic, and a typical operating cycle for a bed where the 'product' gas is the unadsorbed component(s) may comprise a first period in which the basic feedstock is made available to the bed, the undesired component(s) are adsorbed and the unadsorbed component(s) drawn off by means of a compressor; a second, regeneration period in which the product compressor is disconnected and a vacuum pump is applied to the 'upstream' side of the bed to remove the adsorbed component(s); and a third period in which the bed is backfilled with product quality gas in preparation for the commencement of the next cycle. A typical PSA plant operating on this type of cycle may therefore comprise three adsorbent beds (sharing a common product compressor and vacuum pump) the operation of the beds being sequenced such that at any one time one bed is in the adsorption period of its cycle, another bed is in the regeneration period of its cycle and the remaining bed is in the backfilling period of its cycle. In this way a constant supply of product gas can be obtained. Two bed PSA plants using the same type of cycle are also known, the operation of the beds in such a plant being sequenced such that one bed is in its adsorption period while the other bed is in its regeneration and backfilling periods, and vice versa. Many variations in the arrangement of adsorbent beds and in the operating cycles are possible.

Synthetic zeolite materials are knwon which have sufficiently selective gas sorptivity to separate the two major components of air, i.e. nitrogen and oxygen, and pressure swing adsorption is becoming an increasingly important technique for the on-site production of oxygen and nitrogen from the atmosphere. One field in which the atmospheric PSA plant is particularly useful is sewage treatment, where there is a need to supply oxygen-rich gas to activated sludge reactors. Naturally, the demand for such gas at any particular time depends upon the quantity and condition of the material in the reactor, and can fluctuate quite considerably. It is therefore necessary to be able to match the gas supply to the demand (i.e. to achieve a useful turn-down range for the PSA plant).

One way to achieve the required matching of the gas supply to the demand is to keep the PSA plant operating at its rated capacity and simply to vent that amount of product gas which is excess to requirements. This is, however, very wasteful and results in the PSA plant consuming far more power than is necessary. The invention therefore primarily seeks to provide for a useful reduction in power consumption when the demand for product gas falls in the context of the supply of oxygen-enriched gas by a PSA plant as described above, bearing in mind that the major power consumer in such a plant is the vacuum pump; (when operating at the rated capacity of the plant the ratio of the power consumptions of the vacuum pump and product compressor is roughly equal to the ratio of the quantities of the adsorbed and unadsorbed components in the basic feedstock, or about 7:1 in the case of a PSA plant producing oxygen from the atmosphere). This is not to be taken to imply, however, that the invention is limited in its applicability to oxygen-producing PSA plants.

SUMMARY OF THE INVENTION

The invention resides in a fluid supply system including a pressure-swing adsorption plant and comprising: a first fluid-dynamic machine for impelling a first fluid stream from the plant to utilisation apparatus at a variable rate dependent upon the demand of the utilisation apparatus for such fluid; a second fluid-dynamic machine of greater capacity than the first for impelling a second fluid stream from the plant; means sensitive to the demand of the utilisation apparatus for said first fluid; and means for controlling the rate of delivery of the second fluid-dynamic machine in response to signals from said sensing means such that a reduction in the demand of the utilisation apparatus for said first fluid results in a reduction in the power consumption of the second fluid-dynamic machine.

In the case where the PSA plant is of the type previously described the first and second fluid-dynamic machines are constituted respectively by the product compressor and the vacuum pump of the plant, the first and second fluids being respectively the unadsorbed and adsorbed component(s) of the feedstock.

There are various ways in which the first fluid dynamic machine can be adapted to supply the first fluid to the utilisation apparatus in accordance with the demand of the latter. However, in the case of a PSA plant producing oxygen from the atmosphere as previously described wherein the first fluid dynamic machine (i.e. the product compressor) consumes only a minor proportion of the total power consumed by the two machines, the first fluid dynamic machine may conveniently comprise a positive displacement machine run at constant speed and having a bypass line for recirculation of the product, the recirculation being regulated e.g. in response to signals from a pressure sensor at the utilisation apparatus or in the delivery line from the machine to the utilisation apparatus if that pressure is sufficiently representative of the demand of the utilisation apparatus.

Likewise there are various ways in which the delivery rate and power consumption of the second fluid dynamic machine can be controlled in accordance with the demand of the utilisation apparatus. Since the rate at which the first fluid dynamic machine supplies the first fluid to the utilisation apparatus is determined by the demand of the latter then that rate will itself be a measure of the demand and the second fluid dynamic machine may therefore be controlled in response to signals from a flowmeter sensitive to the rate of fluid flow in the delivery line from the first fluid dynamic machine to the utilisation apparatus. Alternatively the second fluid dynamic machine may be controlled in response to signals from a pressure sensor at the utilisation apparatus or in the delivery line from the first fluid dynamic machine to the utilisation apparatus if that pressure is sufficiently representative of the demand of the utilisation apparatus.

The nature of the control exercised over the second fluid dynamic machine will depend upon the type of machine employed. For example if the machine comprises a positive displacement or centrifugal pump the delivery rate and power consumption of which are determined by running speed, then a speed regulator may be provided for controlling the operation of the machine in response to the signals from the demand-sensitive means. Again, if the machine comprises a Rootes blower or the like wherein delivery rate and power consumption are determined by the pressure difference across the machine then means for controlling that pressure difference in response to signals from the demand-sensitive means may be provided. Alternatively, whatever type of machine is used as the second fluid dynamic machine, its power consumption may be minimised by intermittent operation.

BRIEF DESCRIPTION OF THE DRAWINGS

The invention will now be more particularly described, by way of example, with reference to the accompanying drawings, in which.

Like reference numerals denote like parts in the two figures.

DESCRIPTION OF THE PREFERRED EMBODIMENTS

Figure 1:
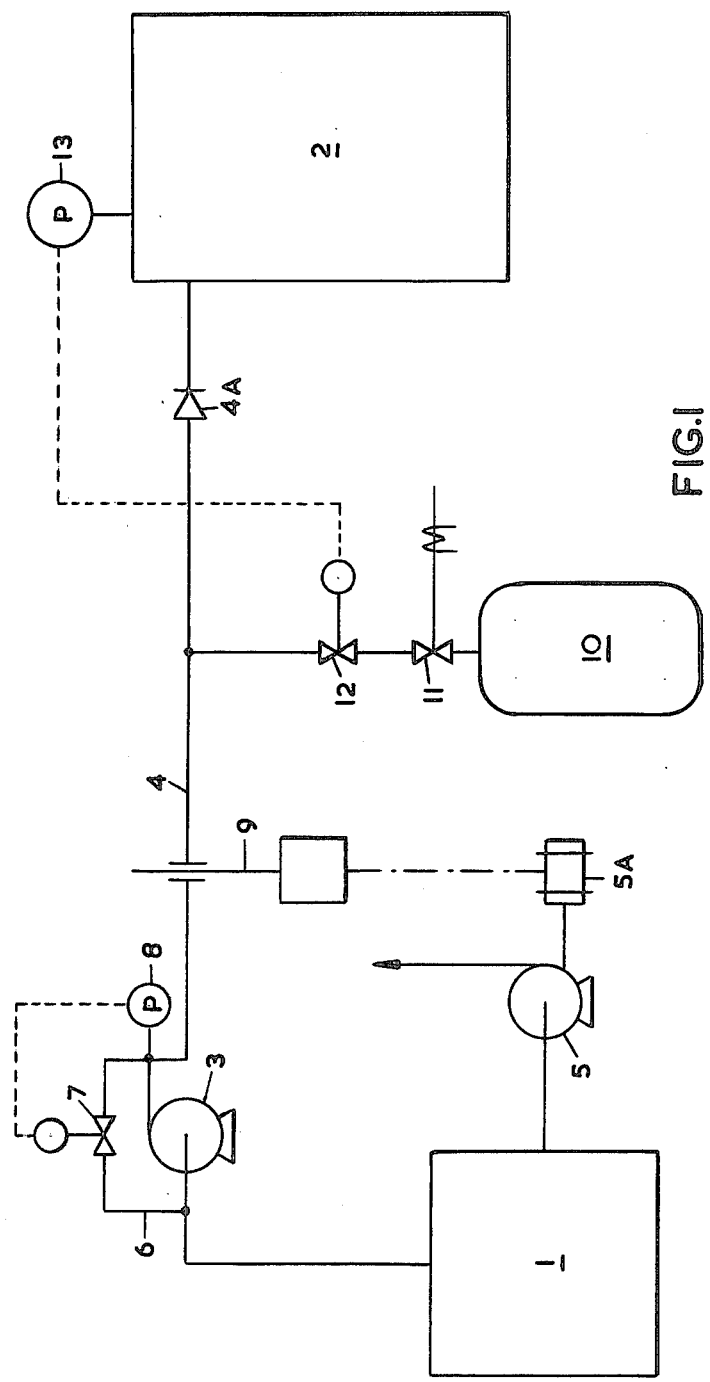
FIG. 1 is a schematic representation of one embodiment of a fluid supply system according to the invention, comprising a PSA plant for supplying oxygen-rich gas to an activated sludge reactor.

Referring to FIG. 1, reference numeral 1 indicates generally a PSA plant which is adapted to produce oxygen-rich gas from atmospheric air for supply to utilisation apparatus in the form of an activated sludge reactor 2, at a sewage works. To this end the plant comprises beds of a synthetic zeolite which adsorbs more readily the nitrogen than the oxygen in the air feedstock. The plant has a product compressor 3 by which the air is drawn through the adsorbent beds and the oxygen-rich, unadsorbed gas is supplied via line 4 and non-return valve 4A to the reactor 2, and a vacuum pump 5 by which the adsorbent beds are regenerated and the adsorbed components exhausted back to the atmosphere. As indicated previously the major power consumer in such a system is the vacuum pump 5, at the rated capacity of the plant its power consumption being in the order of seven times that of the product compressor 3.

The compressor 3 is adapted to supply the oxygen-rich product to the reactor 2 at a variable rate dependent upon the demand of the reactor, so as to maintain a substantially constant preselected reactor pressure. To this end the compressor, which is a constant displacement machine, has a bypass line 6 incorporating a regulator valve 7, and a sensor 8 is provided for sensing the pressure in the delivery line 4 from the compressor 3 to the reactor, which pressure does, of course, vary with the reactor pressure. The pressure sensor 8 produces a signal for controlling the opening of the valve 7 such that if the demand of the reactor for the oxygen-rich gas decreases and the reactor pressure therefore tends to rise the opening of valve 7 increases to recirculate a greater proportion of the delivery of compressor 3, the rates of extraction of the product gas from the PSA plant 1 and of delivery of such gas to the reactor 2 consequently dropping. Conversely, if the demand of the reactor increases such that the reactor pressure tends to drop the opening of valve 7 decreases to give a higher rate of delivery of the product gas from plant 1 to reactor 2.

The rate of delivery of gas through line 4 is sensed by an integrating flowmeter 9 which produces a signal for controlling the operation of the vacuum pump 5. The pump 5 is a positive displacement or centrifugal machine driven by a variable speed electric motor 5A which is controlled in response to the signals produced by the flowmeter 9 such that an increase in the demand of the reactor 2 for the oxygen-rich gas and the consequent increase in the rate of delivery from compressor 3 through line 4 causes the running speed and rate of delivery of the pump 5 to increase and conversely a reduction in the demand of the reactor 2 and the consequent decrease in the rate of delivery from compressor 3 through line 4 causes the running speed and rate of delivery of the pump 5 to decrease. It will be appreciated that the slower the pump runs the longer it will take to fully evacuate the adsorbent bed of the PSA plant which is undergoing regeneration, and it is therefore arranged that the time cycle of the plant (i.e. the time taken for a bed to go through a complete cycle of production, regeneration and backfilling) is correspondingly extended. The overall rate of production of oxygen-rich gas by the plant is correspondingly reduced, the balance to satisfy the constant throughput of the product compressor being recirculated through its bypass line 6. In this way the rate of delivery of the adsorbed components by pump 5 and consequently also the power consumed by the pump is arranged to be the minimum necessary for maintaining the supply of the amount of oxygen-rich gas demanded by the reactor.

Preferably, the period over which the flow of the oxygen-rich gas through line 4 is integrated by flowmeter 9 is adjustable so as to maintain the smoothest response in the operation of the PSA plant to variations in the demand of the reactor 2. The rate at which demand of an activated sludge reactor for such gas varies is generally relatively slow, and an integration period corresponding to, say, three time cycles of the PSA plant when on full output should usually be sufficient.

In addition to the PSA plant 1 a 'back-up' system is provided for supplying oxygen to the reactor 2, this comprising a reservoir 10 of liquid oxygen which can be supplied through a vaporiser to the reactor 2 in the event of the demand of the reactor exceeding the capacity of the PSA plant or if the plant has to be shut down for any reason. The supply of oxygen from reservoir 10 is controlled by a solenoid-actuated open-shut valve 11 and a regulator valve 12. Open/shut valve 11 opens in response to the complete closure of regulator valve 7 in the product compressor bypass line, which is arranged to occur only when the PSA plant is failing to meet the demand of reactor 2 or is shut down. As a safeguard against mal operation on the closure of regulator valve 7, the open/shut valve 11 may be arranged to open if the pressure in the reactor 2 falls to a level somewhat below the normal working pressure. This would be provided for e.g. by the provision of a pressure switch connected to reactor 2 and set to operate at the appropriate pressure level. The opening of regulator valve 12 is controlled in response to signals from a pressure sensor 13 in the ullage space of the reactor so as to maintain the reactor pressure substantially constant at its preselected value. Alternatively, regulator valve 12 could be a mechanical device which increases or decreases the oxygen flow through it so as to maintain its set discharge pressure, which in turn maintains a constant preselected reactor pressure.

Figure 2:
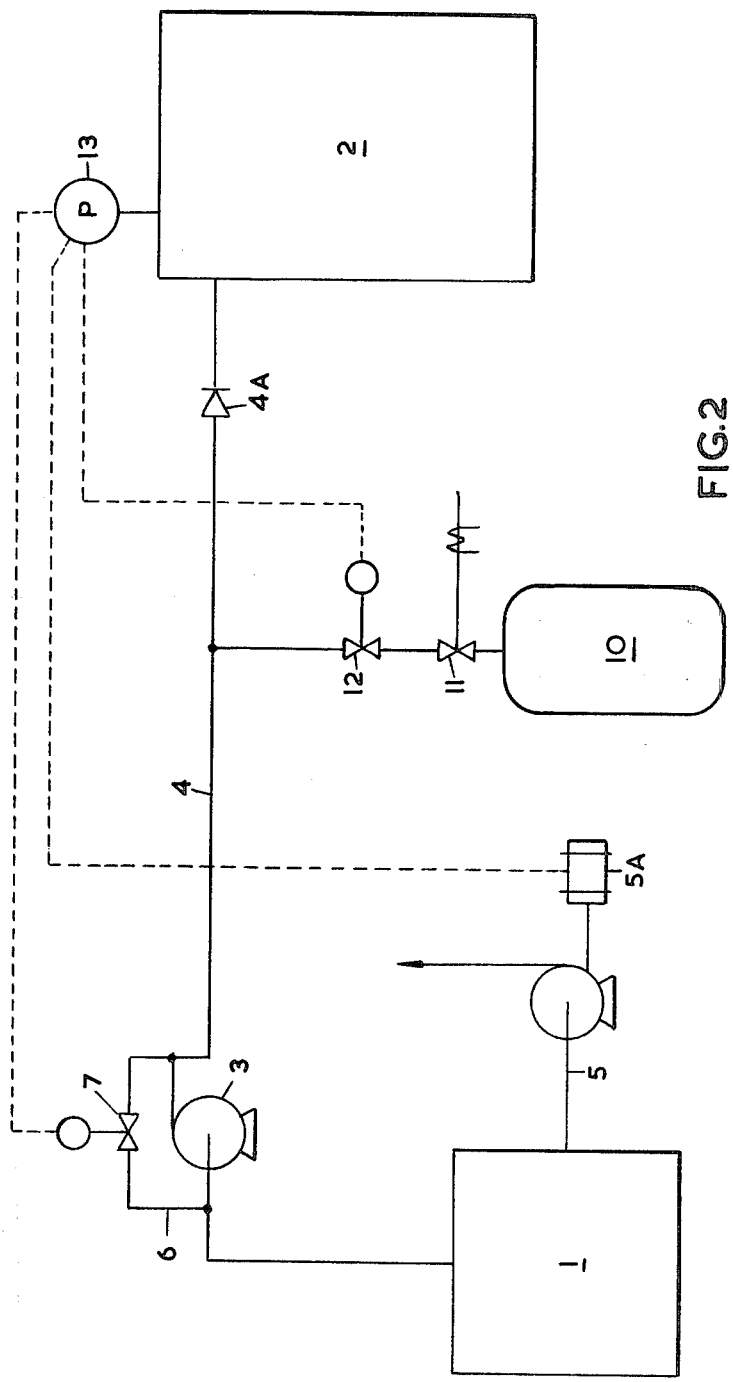
FIG. 2 is a schematic representation of an alternative embodiment to that of FIG. 1.

Referring now to FIG. 2 this shows a modification to the system of FIG. 1 in which the pressure sensor 8 and the flowmeter 9 are eliminated, and the opening of regulator valve 7 and the running speed of vacuum pump 5 are each controlled in response to signals from the pressure sensor 13 in the ullage space of the reactor 2. The manner of operation of the system is, however, substantially the same as in the FIG. 1 embodiment, the opening of valve 7 increasing and the running speed of pump 5 decreasing in response to an increase in reactor pressure (i.e. to a decrease in the demand for the oxygen-rich gas from the PSA plant) and the opening of valve 7 decreasing and the running speed of pump 5 increasing in response to a decrease in reactor pressure (i.e. to an increase in the demand of the reactor).

We claim:

1. A fluid supply system including a pressure-swing adsorption plant and comprising in operative relationship a first fluid dynamic machine for impelling a first fluid stream from the plant to utilization apparatus at a variable rate dependent upon the demand of the utilization apparatus for such fluid; a second fluid dynamic machine of greater capacity than the first fluid dynamic machine for impelling a second fluid stream from the plant, sensing means sensitive to the demand of the utilization apparatus for said first fluid; and means for controlling the rate of delivery of the second fluid dynamic machine in response to signals from said sensing means such that a reduction in the demand of the utilization apparatus for said first fluid results in a reduction in the power consumption of the second fluid dynamic machine.

2. A system according to claim 1 wherein the first fluid stream comprises a gas unadsorbed on an adsorbent bed of the plant; the first fluid dynamic machine comprises a compressor for said unadsorbed gas; the second fluid stream comprises gas adsorbed on said adsorbent bed of the plant; and the second fluid dynamic machine comprises a vacuum pump whereby such adsorbed gas is removed from said adsorbent bed of the plant.

3. A system according to claim 1 wherein said sensing means comprise means sensitive to the rate of flow of said first fluid stream from the plant to the utilisation apparatus.

4. A system according to claim 1 wherein said sensing means comprise means sensitive to fluid pressure within the utilization apparatus.

5. A system according to claim 1 wherein said second fluid dynamic machine is of a type such that its delivery rate and power consumption are determined by its running speed; and said control means comprise means for controlling such running speed in response to signals from said sensing means.

6. A system according to claim 1 wherein said first fluid dynamic machine comprises a constant displacement machine provided with a bypass line for recirculation of a proportion of its throughput, and means for regulating the flow through said bypass line in response to signals from said sensing means.

7. A system according to claim 1 further including a first fluid reservoir and means for effecting the supply of fluid from said reservoir to the utilization apparatus when the demand of the utilization apparatus for said first fluid is not satisfied by the pressure-swing adsorption plant.

8. A system according to claim 1 wherein the pressure-swing adsorption plant produces an oxygen-rich gas as said first fluid from a feedstock including oxygen and nitrogen.

9. A system according to claim 1 wherein said sensing means comprise means sensitive to fluid pressure within a delivery line for the first fluid stream from the plant to the utilization apparatus.

10. A fluid supply system including a pressure-swing adsorption plant and comprising in operative relationship a first fluid dynamic machine for impelling a first fluid stream from the plant to utilization apparatus at a variable rate dependent upon the demand of the utilization apparatus for such fluid; a second fluid dynamic of greater capacity than the first fluid dynamic machine for impelling a second fluid stream from the plant; sensing means sensitive to the demand of the utilization apparatus for said first fluid; and means for controlling the rate of delivery of the second fluid dynamic machine in response to signals from said sensing means such that a reduction in the demand of the utilization apparatus for said first fluid results in a reduction in the power consumption of the second fluid dynamic machine, said first fluid dynamic machine comprising a constant displacement machine provided with a bypass line for recirculation of a proportion of its throughput, and means for regulating the flow through said bypass line in response to signals from said sensing means.

* * * * *